Figures 1, 2, 3, 4:
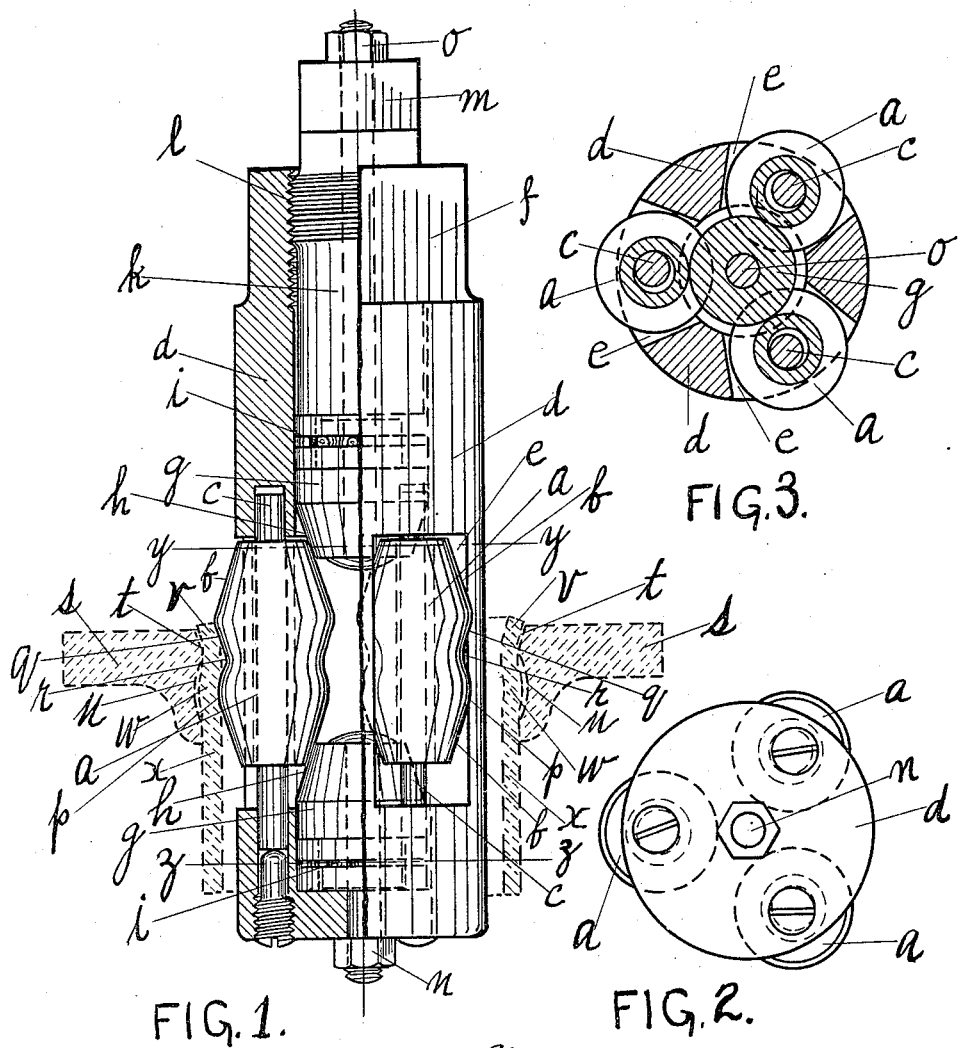

H. G. GILLMOR.
DEVICE FOR EXPANDING PIPES, TUBES, &c.
APPLICATION FILED MAR. 19, 1908.

1,046,457.

Patented Dec. 10, 1912.

Witnesses

Inventor
H. G. Gillmor

UNITED STATES PATENT OFFICE.

HORATIO G. GILLMOR, OF QUINCY, MASSACHUSETTS.

DEVICE FOR EXPANDING PIPES, TUBES, &c.

1,046,457.

Specification of Letters Patent. Patented Dec. 10, 1912.

Application filed March 19, 1908. Serial No. 422,186.

*To all whom it may concern:*

Be it known that I, HORATIO G. GILLMOR, a citizen of the United States, residing at Quincy, county of Norfolk, State of Massachusetts, have invented a new and useful Device for Expanding Pipes, Tubes, &c., and Flaring the Ends Thereof, of which the following is a specification.

My invention relates to expanders of pipes, tubes, etc., and one of the objects of my invention is to produce a simple and efficient device which shall be compact and so easy to operate as to be adapted to hand operation.

Another object of the invention is to provide a device which may be employed for flaring the ends of the pipe or tube, and expanding the outer surfaces of the flared ends into intimate contact with tapered surfaces of the pipe flange.

Further objects will hereinafter appear and to these ends the invention consists of an expander for carrying out the above objects embodying the features of construction, combination of elements, and arrangement of parts, substantially as hereinafter described and claimed in this specification, and shown in the accompanying drawings, in which,—

Figure 1 is a side elevation, partly in section, showing the position of the device with relation to a tube and flange when the device is employed for flaring and expanding the end of the pipe. Fig. 2 is an end view of the expander. Figs. 3 and 4 are sections of the parts at the planes indicated by ($y$ $y$) and ($z$ $z$), respectively, in Fig. 1.

Similar letters refer to similar parts throughout the several views.

($a$) represents hardened steel rolls the ends of which are tapered as at ($b$) and the middle portion necked formed with surfaces ($p$) and ($q$) between which there is a neck or groove ($r$). The pins ($c$) traverse axial holes in the rolls greater in diameter than the pins ($c$) and retain the rolls in position circumferentially in the frame or case ($d$) constructed with openings ($e$) for the rolls and surfaces ($f$) at one end for applying a wrench or other means of turning the device.

($g$), ($g$) represent two bearings within the case ($d$) provided with conical surfaces ($h$) corresponding to and arranged to bear upon the two tapered ends of the rolls ($a$). The bearings ($g$) are arranged to revolve freely within the case ($d$) and the thrust bearings ($i$) reduce the frictional resistance.

($k$) is a plug threaded at ($l$) and arranged to screw into the case ($d$) as shown by applying a wrench at ($m$).

One of the bearings ($g$) is secured against endwise movement within the case ($d$) by the bolt and nut ($n$), upon which it loosely fits so as to revolve freely. The other bearing is similarly attached to the plug ($k$) by a bolt and nut ($o$) permitting free rotation of the bearing about the bolt. In dotted lines there are shown at ($x$) a pipe and at ($s$) a flange formed with interior convex surfaces ($u$) and flaring surfaces ($t$) at its face end. To attach the pipe securely to the flange it is expanded at ($w$) and flared at ($v$) and its exterior surface forced into close contact with the surfaces of the flange. The surfaces ($p$) and ($q$) of the rolls are made to correspond to the surfaces ($u$) and ($t$) of the flange.

The expander is operated by inserting it in the pipe, after the pipe has been placed in position, until the surfaces ($p$) of the rollers are approximately opposite the convex surfaces ($u$) of the flange. By screwing the plug ($k$) into the case ($d$) the distance between the bearings ($g$) is reduced and the rolls ($a$) are forced radially outward until they are in contact with the interior of the pipe. The expander is then rotated by means of a wrench applied at ($f$), or otherwise, and from time to time the plug ($k$) is screwed more and more into the case ($g$) and the rotation of the expander continued. The surfaces ($p$) and ($q$) of the rolls bearing upon the pipe will bilge the pipe at ($w$) and flare the end at ($v$) and by continuing the operation the exterior of the pipe will be expanded and forced into intimate contact with the convex surfaces ($u$) and the flaring surfaces ($t$) of the flange. Even though the expander may not have been accurately placed in position with respect to the convex surfaces ($u$) of the flange, during the operation of expanding it will adjust itself to the proper position as the expanding proceeds. During the rotation of the expander as a whole the bearings ($g$) will revolve within the case ($d$) at a rate considerably greater than the rate at which the case ($d$) is rotated and to reduce the frictional resistance due to the end thrust upon the bearings ($g$) I prefer to employ a ball or roller thrust bearing ($i$)

or some other means of reducing the friction.

It will readily be understood that the rolls may be formed to correspond to any desired form for the flaring surfaces (*t*) of the flange either conical or of double curvature and that any desired variation in the form of the surfaces (*u*) of the flange may also be provided for. It will also be understood that the expander may be employed for expanding pipes or tubes into plates, heads, sockets, etc. as well as for expanding them into the flanges used for joining lengths of pipes or tubes to one another.

Obviously some features of this invention may be used without others and the invention may be embodied in widely varying forms.

Therefore, without limiting the invention to the construction shown and described or enumerating equivalents what I claim and desire to secure Letters Patent for is:

1. An expander including in combination with a plurality of rolls, each having oppositely tapered ends, a cage constructed to hold said rolls, so as to permit rotation and limited radial movement thereof, and a bearing in two parts having oppositely inclined conical surfaces engaging with the tapered ends of said rolls and arranged to rotate within said cage and to transmit to said cage the end thrust of said rolls upon said bearing.

2. The combination in an expander of a case, a plurality of double conical rolls arranged to rotate and have limited radial movement within said case, two conical parts formed to rotate within, while transmitting to said case the end thrust of said rolls upon said conical parts, and means for changing the relative endwise position of the two said conical parts, and thereby changing the radial positions of said rolls, substantially as described.

3. An expander, including in combination rolls, a rotatable bearing comprising two parts having oppositely inclined conical surfaces and a case within which said parts may rotate while transmitting end thrust thereon to said case.

4. An expander, including, in combination with a case adapted to receive rolls, a roll having an axial hole extending the whole length of said roll and a pin traversing said roll of less diameter than said axial hole, engaging with said frame so as to retain said roll in position while permitting rotation and limited movement thereof.

5. An expander comprising a plurality of rolls having tapered ends and a grooved middle portion a case holding said rolls in such manner as to permit rotation and limited radial movement thereof, two bearings adapted to revolve freely within said case, having oppositely disposed conical surfaces corresponding to and adapted to bear upon the two tapered ends of said rolls, and means whereby said bearings may be forced toward one another.

6. An expander comprising a plurality of rolls having tapered ends, a case holding said rolls in such manner as to permit rotation and limited radial movement of said rolls and provided with interior threads at one end thereof, two bearings adapted to revolve freely within said case, having oppositely disposed tapered surfaces corresponding to and adapted to bear upon the two tapered ends of said rolls, and a plug screwing into said case and adapted to force one of said bearings toward the other and thereby force said rolls outwardly, substantially as and for the purpose described.

7. An expander comprising a plurality of rolls having tapered ends, a case having internal screw threads at one end thereof arranged to hold said rolls in such manner as to permit rotation and limited radial movement thereof, two bearings adapted to rotate freely within said case, a plug screwing into said case and adapted to force said bearings toward one another, and friction reducing means between said bearings and said case and plug, substantially as and for the purposes described.

In testimony whereof I have signed this specification in the presence of two subscribing witnesses.

H. G. GILLMOR.

In the presence of—
THOMAS H. KELLY,
MICHAEL A. HORIGAN.

---

Copies of this patent may be obtained for five cents each, by addressing the "Commissioner of Patents, Washington, D. C."